US008219665B2

(12) United States Patent
Backman

(10) Patent No.: US 8,219,665 B2
(45) Date of Patent: Jul. 10, 2012

(54) METHOD AND SYSTEM FOR DISCOVERY VIA TRIBAL KNOWLEDGE

(75) Inventor: Terje K. Backman, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 1297 days.

(21) Appl. No.: 11/073,900

(22) Filed: Mar. 7, 2005

(65) Prior Publication Data

US 2006/0200571 A1  Sep. 7, 2006

(51) Int. Cl.
*G06F 15/173* (2006.01)

(52) U.S. Cl. ..................................... 709/224

(58) Field of Classification Search ........... 709/223, 709/224, 230, 220
See application file for complete search history.

(56) References Cited

U.S. PATENT DOCUMENTS

| | | | | |
|---|---|---|---|---|
| 5,818,603 | A * | 10/1998 | Motoyama | 358/296 |
| 6,674,767 | B1 * | 1/2004 | Kadyk et al. | 370/466 |
| 6,675,196 | B1 * | 1/2004 | Kronz | 709/203 |
| 7,328,434 | B2 * | 2/2008 | Swanson et al. | 717/168 |
| 7,336,602 | B2 * | 2/2008 | Silvester | 370/216 |
| 7,353,291 | B1 * | 4/2008 | Ogino | 709/239 |
| 7,421,483 | B1 * | 9/2008 | Kalra | 709/220 |
| 2003/0033389 | A1 * | 2/2003 | Simpson | 709/220 |
| 2003/0078036 | A1 | 4/2003 | Chang et al. | |
| 2003/0217201 | A1 * | 11/2003 | Gargi et al. | 710/16 |
| 2006/0161689 | A1 * | 7/2006 | Anderson | 710/5 |
| 2006/0170943 | A1 * | 8/2006 | Hanson et al. | 358/1.13 |
| 2006/0200571 | A1 * | 9/2006 | Backman | 709/230 |

FOREIGN PATENT DOCUMENTS

| | | |
|---|---|---|
| CN | 1832422 | 9/2006 |
| EP | 0806855 A2 | 11/1997 |
| EP | 1091522 A2 * | 4/2001 |
| EP | 1528751 A2 | 5/2005 |
| EP | 1701472 | 9/2006 |
| GB | 2340699 A * | 2/2000 |
| IN | 251/DEL/2006 | 8/2007 |
| JP | 05292147 | 11/1993 |
| JP | 08227387 | 9/1996 |
| JP | 10084399 | 3/1998 |
| JP | 10289069 A * | 10/1998 |

(Continued)

OTHER PUBLICATIONS

"Foreign Office Action", Japanese Application No. 2006-061743, (Apr. 22, 2011), 4 pages.

(Continued)

*Primary Examiner* — Krista Zele
*Assistant Examiner* — Esther Benoit
(74) *Attorney, Agent, or Firm* — Wolfe-SBMC

(57) ABSTRACT

The invention provides one or more modules that may be used to automatically configure a computing device to communicate over a network. When a polling computer is connected to a network, it monitors network traffic to determine the protocols being used on the network. These protocols are then installed and loaded onto the polling computer. The polling computer may find voting computers on the network and send queries to the voting computers to discover network information such as network settings and network resources. The polling computer stores the results in a data structure, which may be sorted and is searchable to find the most popular network settings and resources used on the network. Network settings and resources may be automatically applied to the polling computer or the user may be provided with a user interface allowing the user to select particular settings and/or resources.

20 Claims, 13 Drawing Sheets

FOREIGN PATENT DOCUMENTS

| JP | 11041317 | 2/1999 |
| JP | 2005135414 | 5/2005 |
| JP | 200661743 | 9/2006 |
| KR | 20060097568 | 9/2006 |

OTHER PUBLICATIONS

"Foreign Office Action", Chinese Application No. 200610004312.5, (Jul. 4, 2011), 12 pages.

"Foreign Office Action", European Patent Application No. 06110329.7, (Jul. 26, 2011), 7 pages.

European Search Report for 06110329.7 mailed Apr. 24, 2006.

Liming et al., "Design and Implementation of a Dynamic Protocol Framework," Networks, 2004. (ICON 2004). Proceedings. 12th IEEE International Conference on Singapore Nov. 16-19, 2004, Piscataway, NJ, US, IEEE, US, vol. 2, Nov. 16, 2004, pp. 552-558, XP010779506.

Office Action for EP 06 110 329.7 dated Feb. 24, 2009.

"Foreign Office Action", Chinese Application No. 200610004312.5, (Jan. 31, 2012), 6 pages.

\* cited by examiner

FIG. 13
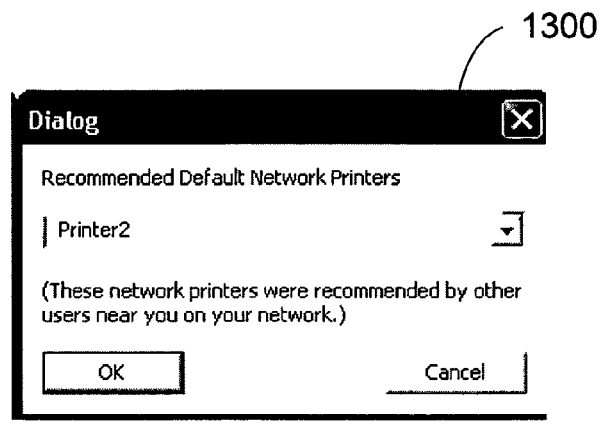
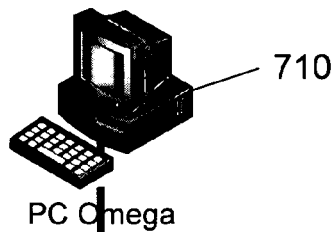
PC Omega
| Tribal Knowledge Database |||||||||
|---|---|---|---|---|---|---|---|---|
| PC Name | Protocol | Address | Gateways | Printers | Proxies | Email Ser | Favorites | Databases |
| Alpha | Appletalk | addr1 | gateway1 | printer1 | n/a | pop1 | favs1 | dblist1 |
| Beta | TCP/IP | addr2 | gateway2 | printer2 | proxy1 | pop2 | favs2 | dblist1 |
| Gamma | TCP/IP | addr3 | gateway2 | printer2 | proxy1 | pop2 | favs3 | dblist2 |
| Gamma | Appletalk | addr4 | gateway1 | n/a | n/a | pop2 | favs4 | dblist1 |
| ... | ... | ... | ... | ... | ... | ... | ... | |
212

METHOD AND SYSTEM FOR DISCOVERY VIA TRIBAL KNOWLEDGE

FIELD OF THE INVENTION

This invention pertains to configuring a computing device for operation on a network, and more particularly for automatic configuration of a computing device and automatic discovery of network resources.

BACKGROUND OF THE INVENTION

Connecting a computing device, such as a personal computer, to a network can be time consuming and difficult. Network settings, such as network protocols, IP subnets, gateways, subnet masks, etc., are not readily apparent or easy to obtain for a typical user. This type of configuration information is usually controlled by a network administrator, service provider, or other network support staff. Users that want to join a network must rely on others to provide them with the settings needed to connect to the network. This wastes the time of both the user and the person providing the information to the user. Even when the user has finally obtained the settings needed to connect to the network, actually applying these settings can be confusing and difficult for many users. Attempting to apply these settings can lead to additional wasted time and frustration on the part of the user and anyone attempting to help the user connect to the network. Thus, there is currently no easy way for a user to connect to a network without significant interaction by the user and/or others.

Similarly, other useful network information is typically only available by word of mouth or independent discovery by a user. Information such as popular and useful websites, important public file servers, peer networks, and other types of shared internet resources must be discovered by a user in order for the user to even know that these resources exist, much less be able to connect and utilize them. Many times, a user may not ever discover these types of resources, despite the usefulness of these resources and their potential to increase the user's productivity. There is, therefore, currently no easy way for a user to find network resources because a user must either ask another person for this type of information (assuming the person they ask is even aware of a given resource) or spend a significant amount of time independently searching for these types of resources on their own. Clearly, neither of these approaches are efficient and both can be prohibitively difficult for a novice computer user.

BRIEF SUMMARY OF THE INVENTION

The invention provides a way for a computing device to automatically configure itself to communicate on a network without requiring user interaction. In summary, when a new computer (polling computer) is added to a network, the polling computer finds out which network configuration settings and resources are most commonly used amongst other computers (voting computers) on the network. The polling computer then selects these settings and resources as defaults to enable the polling computer to communicate over the network and find network resources without requiring user interaction.

More specifically, embodiments of the invention provide one or more modules that may be used to automatically configure a computer to communicate over a network. When the polling computer is connected to a network, it monitors network traffic to determine the protocols being used on the network. These protocols are then installed and loaded onto the polling computer. The polling computer can find voting computers on the network and send queries to the voting computers to discover network information such as network settings and network resources. The polling computer stores the results in a data structure, which may be sorted and is searchable to find the most popular network settings and resources used on the network. Settings and resources may be automatically configured to operate on the polling computer or the user may be provided with a user interface allowing the user to select particular settings and/or resources.

These and other advantages of the invention, as well as additional inventive features, will be apparent upon reading the following detailed description and upon reference to the drawings.

BRIEF DESCRIPTION OF THE DRAWINGS

FIG. 13 is a diagram showing a user interface prompting a user to select a recommended network resource.

DETAILED DESCRIPTION OF THE INVENTION

Figure 1:
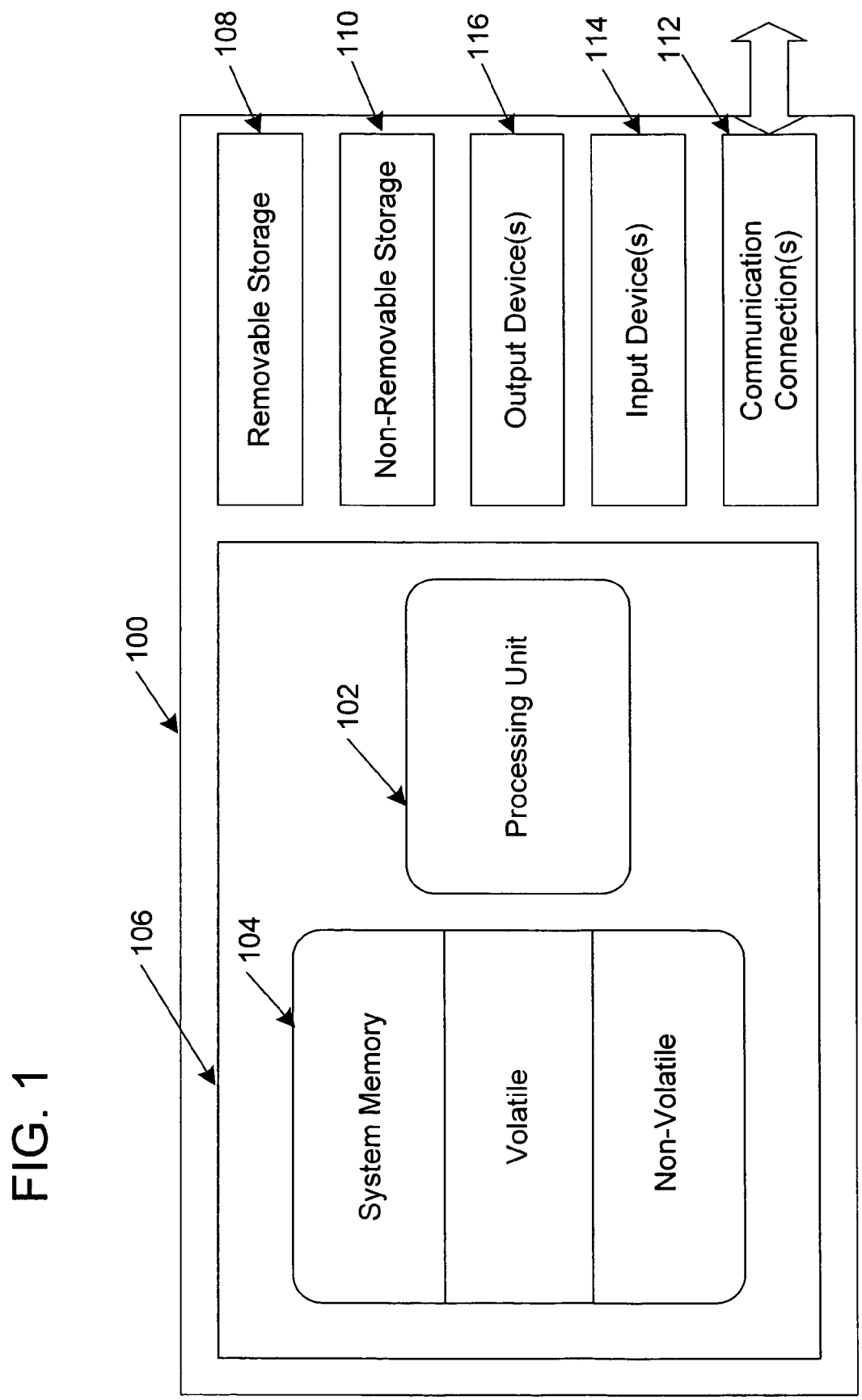
FIG. 1 is a diagram of a simplified computing device.

Turning to the drawings, there is shown in FIG. 1 a computing device 100. In its most basic configuration, device 100 typically includes a processing unit 102 and memory 104. Depending on the exact configuration and type of computing device, memory 104 may be volatile (such as RAM), non-volatile (such as ROM, flash memory, etc.) or some combination of the two. Additionally, device 100 may also have mass storage (removable 108 and/or non-removable 110) such as magnetic or optical disks or tape. Similarly, device 100 may also have input devices 114 such as a keyboard, mouse, touchpad, and touch screen and/or output devices 116 such as a display. Other aspects of device 100 may include communication/network connections 112 to other devices, computers, networks, servers, etc. using either wired or wireless media. All these devices are well know in the art and need not be discussed at length here.

The invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For simplicity, embodiments of the invention may be described generally as applied to a computer. One of ordinary skill in the art, however, would recognize that aspects of the invention are applicable to any suitable computing device 100. For example, embodiments of the invention may be applied to, but are not limited to, personal computers, server computers, hand-held or laptop devices, multiprocessor systems, microprocessor-based systems, programmable consumer electronics, minicomputers, mainframe computers, distributed computing environments that include any of the above systems or devices, and the like.

The invention provides a way for a user to easily configure a computing device 100 to communicate over a network. Once a computing device 100 has been connected to a network 220 (either wirelessly or via a traditional communications cable), the invention may first ascertain which protocols are being used in network communications. The invention can automatically, without any user interaction, install and load the drivers and any other necessary files in order for the computing device 100 to communicate using the discovered protocols. This aspect of the invention can be controlled by the protocol discovery component 202 shown in FIG. 2.

Another aspect of the invention includes polling other computing devices 100 on the network 220 to find out which network settings and network resources they are using. This information is used by the polling computing device (i.e., the device being configured to communicate over the network) to decide which network settings and/or network resources the polling computing device will use. This is accomplished via the network settings component 204 and/or the network resource component 206. Although these two components are described as separate components, they may operate as a single component. Furthermore, the network settings component 204 and the network resource component 206 may individually or in combination be generally described as network information components.

Components of the invention are generally described as being components of a "tribal knowledge" module 200. This is a term of art that is used because the computing device 100 configures itself to communicate on a network and automatically discovers resources on a network by "listening" to and "polling" other computing devices on a network (i.e., tribal members). The computing device 100 that is attempting to communicate on the network may be described as the polling computing device because it sends requests to tribal members for network information. Tribal members vote by providing a response to this request and thus may be referred to as voting computing devices. By providing these responses to the polling computing device, "tribal knowledge" is acquired about other computing devices on the network. In certain embodiments, the most popular settings and resources used by voting computing devices are chosen as default settings and installed on the polling computing device. Therefore, in certain embodiments, tribal members vote by providing responses to requests for information by the polling computer, and this information is used to determine the default settings and resources for a polling computing device attempting to join the tribe/network.

Figure 2:
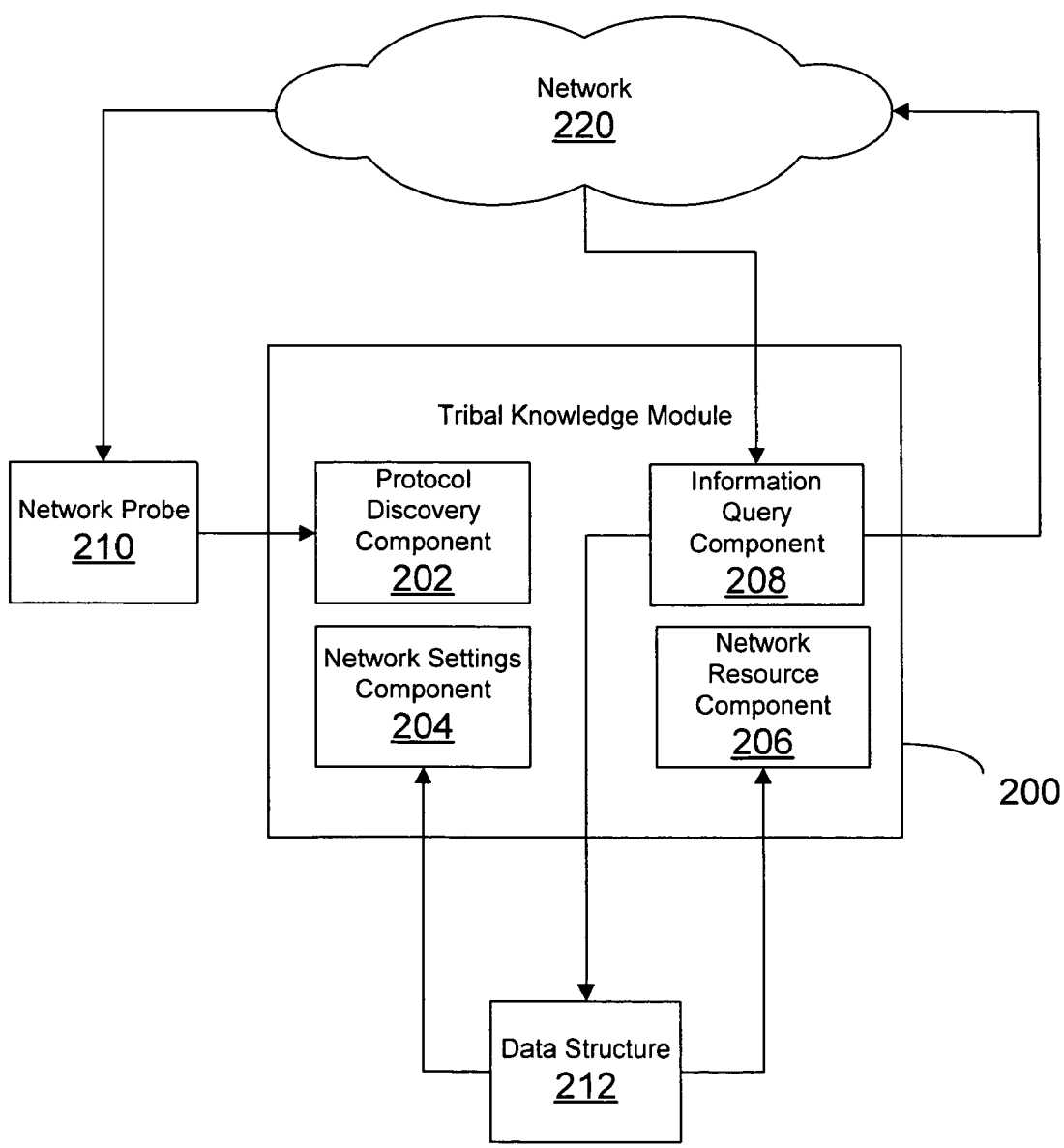
FIG. 2 is a diagram showing a tribal knowledge module in accordance with teachings of the invention.

FIG. 2 shows an example of a "tribal knowledge" module 200 in accordance with teachings of the invention. The tribal knowledge module 200 comprises a set of computer executable instructions for automatically configuring a computer to communicate over a network 220. The tribal knowledge module 200 may comprise at least one of the following, a protocol discovery component 202, a network settings component 204, a network resource component 206, and an information query component 208. The protocol discovery component 202 can comprise a network probe 210 that monitors transmissions on a network 220 to determine protocols being used on the network 220. Alternatively, the network probe 210 can be an independent component that supplies protocol information to the protocol discovery component 202. In certain Microsoft "WINDOWS" based embodiments, the protocol discovery component 202 uses an application such as Microsoft's "NETWORK MONITOR" to monitor the network. "NETWORK MONITOR" allows a network administrator to detect and troubleshoot network problems by monitoring network transmissions. This program is not used for network configuration, but it may be adapted for use in conjunction with the tribal knowledge module 200 to detect and supply protocol information to the protocol discovery component 202. The protocol discovery component 202 uses the protocol information to install and/or load the proper protocol drivers onto a computer.

The information query component 208 sends queries to other computers (voting computers) on the network 220 requesting information about the voting computers. This component of the tribal knowledge module 200 also receives responses to the queries from the voting computers and stores this information in one or more data structures 212. The network settings component 204 uses the data structure 212 to select and apply network settings to the computer. Similarly, the network resource component 206 uses the data structure 212 to select and apply resources on the computer. Both the network settings component 204 and the network resource component 206 may initiate and control the information query component 208. Although each of the components are shown and described as part of a single tribal knowledge module 200, any one or more of the components may instead be an independent module.

Figure 3:
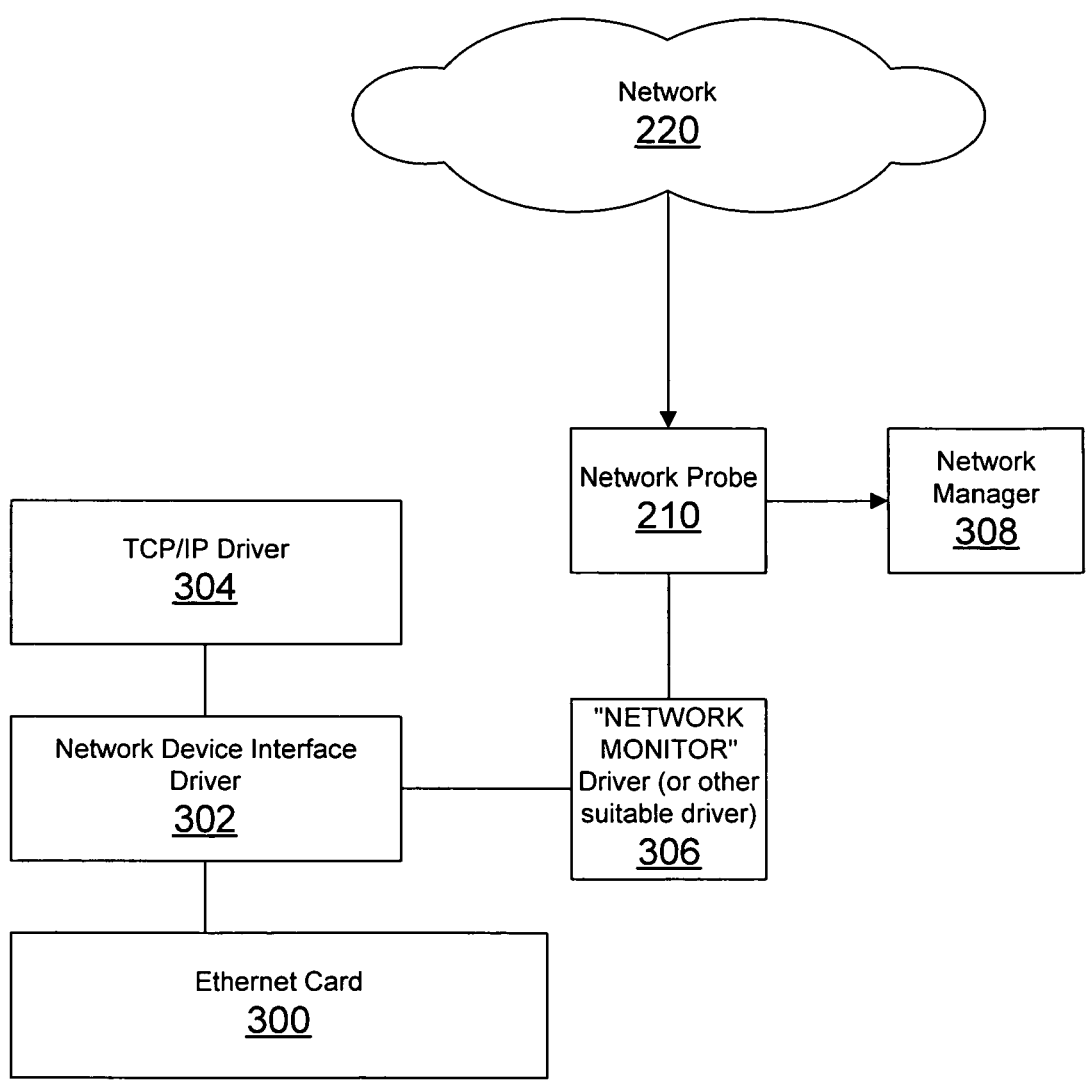
FIG. 3 is a simplified diagram showing network communication layers on a computing device.

There is shown in FIG. 3, a simplified diagram of network communication layers for a computing device in certain embodiments of the invention. The computing device comprises an Ethernet card 300, a network device interface driver 302, and a TCP/IP driver 304, for example. Currently, the Microsoft "WINDOWS XP" operating system has the TCP/IP driver 304 preloaded as a default, so there is no need to install the TCP/IP protocol on computers running this operating system. In a Microsoft "WINDOWS" based operating system, the "NETWORK MONITOR" driver 306 or other suitable driver interacts with the network device interface driver 302 and the network probe 210. The network probe 210 monitors traffic on the network 220 and supplies protocol information to the network manager 308. The network manager 308 can be used to load protocol drivers for protocols detected on the network 220 that have not already been loaded on the computing device. The protocol discovery component 202 may facilitate the interaction between the network probe 210 and the network manager 308, and as described above, the monitoring aspect and/or network probe may be built into the protocol discovery component 202. Although this example has been explained with respect to certain Microsoft "WINDOWS" based operating systems, one of ordinary skill in the art would appreciate that the invention may be applied to any suitable operating system.

Figure 4:
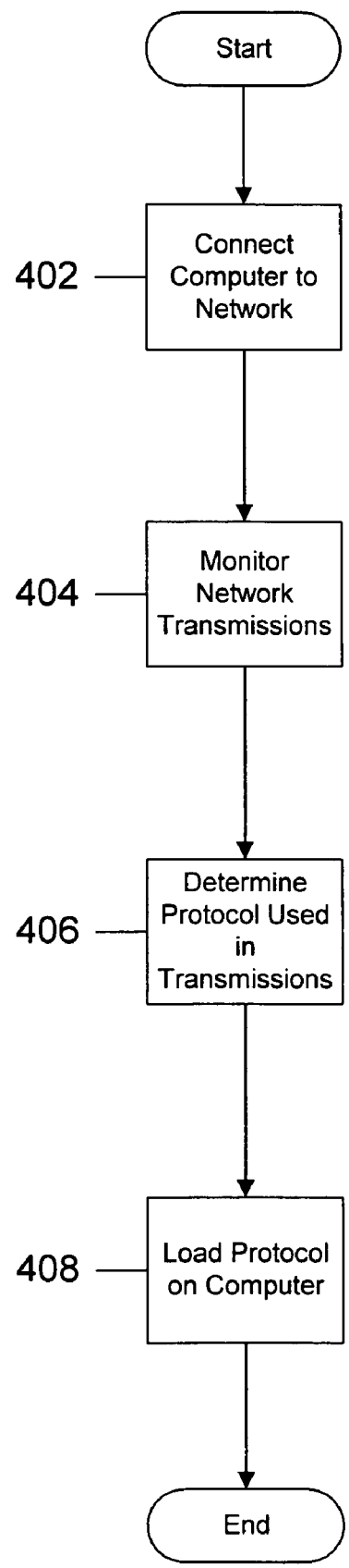
FIG. 4 is a flow diagram for discovering and applying a network protocol.

Embodiments of the invention provide a way for a user to easily configure a computer to communicate on a network 220 by automatically determining network settings and resources on the network. Before a computer can determine which network settings and resources are being used by other computers on a network 220, the computer needs to be configured to communicate with a protocol that other computers on the network are using. The process of discovering and applying a network protocol is shown in FIG. 4. Turning to this figure, a user begins by establishing a connection between a computer and a network 220 in step 402. When connected, the computer begins monitoring transmissions on the network in step 404. The type of protocol being used in a given transmission is determined in step 406. This process may begin automatically once the computer recognizes that it is connected to a network, or it may be initiated by the user.

As the computer determines a particular protocol that is being used in transmissions, the protocol discovery module 202 facilitates the installation (if necessary) and loading of the required driver(s) for this protocol in step 408 (assuming that they have not already been loaded on the computer). The protocol may be automatically loaded by the computer, or the user may be prompted by a user interface (such as a dialog box) to select whether they want to install the drivers for a particular protocol. Examples of network protocols that may be discovered include but are not limited TCP/IP, AppleTalk, Netware, and asynchronous transfer mode (ATM).

By way of example and not limitation, a user may establish a wireless connection between the user's computer and a network 220 that the user would like to join. Once the computer detects that a new network is connected, or at the direction of the user, the protocol discovery component 202 may begin listening to transmissions on the network (i.e., using a network probe 210). When a protocol has been discovered, the protocol discovery component 202 can determine if the required drivers are already installed for the particular protocol. If the drivers have not been installed, then the protocol discovery component 202 may facilitate the installation of the protocol driver and load the protocol driver. As mentioned above, in certain embodiments this process of loading the protocol drivers may be accomplished using the network manager 308. The user's computer may now send and receive network communications using this protocol, and the protocol discovery component 202 can then repeat this process to find any additional protocols used on the network. Therefore, the process described in FIG. 4 is useful for discovering and using protocols that have not already been installed and loaded on a computer.

Once the computer has loaded a given protocol, the computer can discover other computers on the network through queries sent by the information query component 208. This may be accomplished, for example, by sending out broadcasts over the network requesting other computers on the network to respond, or if the user knows of a specific computer on the network, the user may manually provide this information to the information query component 208. Alternatively, the computer may listen for other computers that have sent broadcasts over the network. One of ordinary skill in the art would recognize that any suitable method of finding other computers on the network may be used.

In accordance with the invention, the computer (polling computer) may discover network information used by other computers (voting computers) on the network. This network information may include information about network configuration settings/options and network resources. This type of information is typically only available through word of mouth or a user's own discovery. Thus, user interaction is normally required to both discover a given setting or resource and to configure the computer to use the setting or access the resource. By way of example and not limitation, some of the network settings/options that the computer may discover include information regarding IP subnets, subnet masks, gateways, DNS servers, WINS servers, email servers, ATM addresses, domain controllers, preferred domain names, workgroups, etc. Examples of network resources or other information that may be discovered include websites, printers, public file shares, source code control servers, internet proxy addresses, peer networks, telnet servers, FTP servers, file sharepoints, installed applications software, installed device drivers (download source and current version), installed security patches, operating system version (and latest patches), network attached devices (e.g., universal plug and play devices, etc.), local hardware peripherals (e.g., graphics cards, sound cards, multimedia devices, etc.), IRC chat channels, etc. The resource name, resource internet protocol (IP) address, and/or any other suitable information needed to locate and/or use a given resource may be discovered from a voting computer. One of ordinary skill in the art would recognize that any suitable information about network settings, network resources, or other information about voting computers on a network may be discovered.

Figure 5:
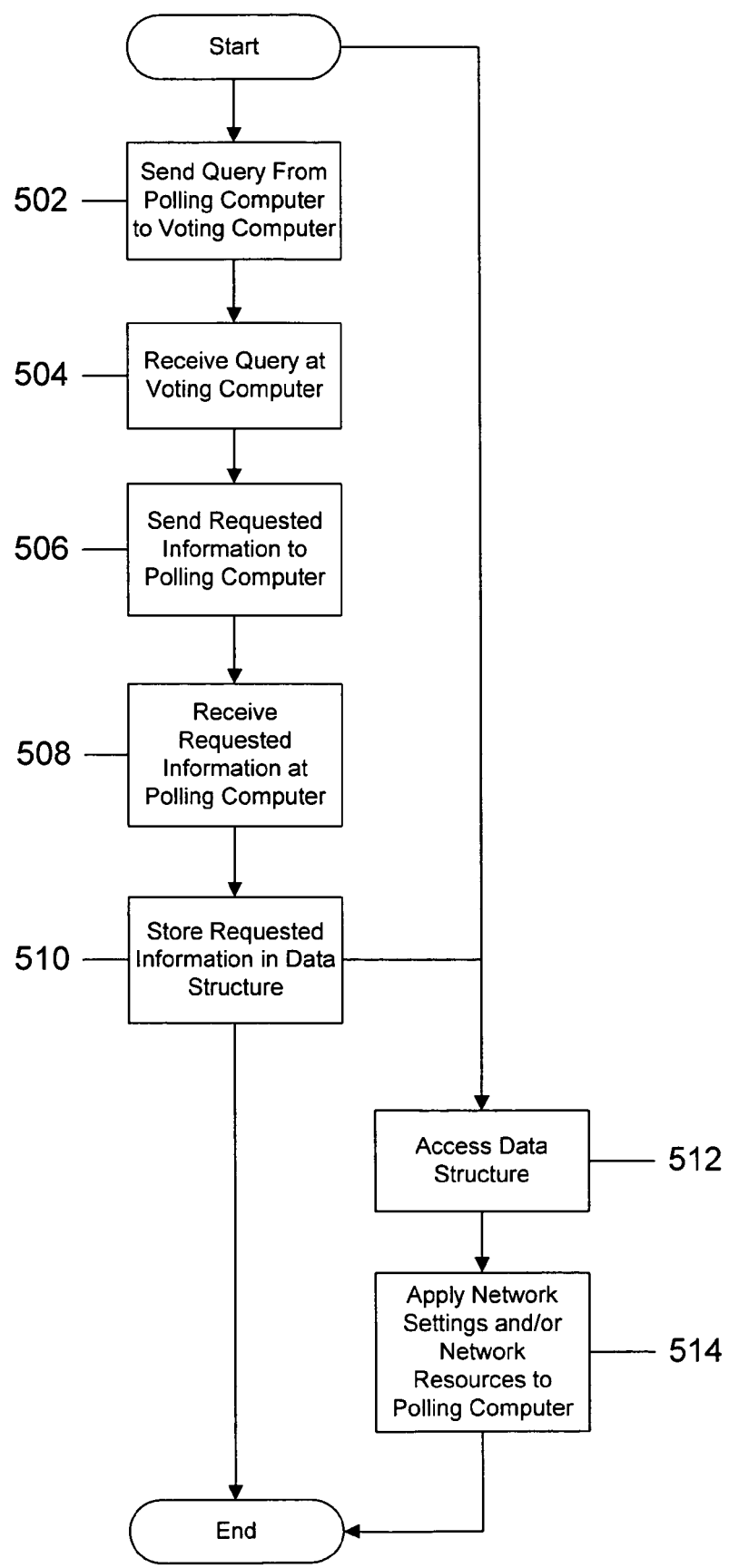
FIG. 5 is a flow diagram for configuring a computing device to use and/or discover network settings and resources.

A process for discovering network settings and resources can be seen in FIG. 5. The information query component 208 of the tribal knowledge module 200 on the polling computer sends a request for configuration and/or resource information to voting computer(s) on the network in step 502. This request is received by one or more voting computers on the network 220 in step 504. In response to the request, the voting computer(s) on the network send the requested information back to the polling computer in step 506. When the information query component 208 at the polling computer receives this information in step 508, the information can be stored in a data structure 212 in step 510. The process may end at this point and can be repeated to find network information associated with other voting computers.

Following the aforementioned steps, the information in the data structure can be used to configure a computer to use network settings and/or network resources. The data structure 212 may be accessed in step 512 to retrieve network information associated with the voting computer(s). This information may then be applied to the polling computer as depicted in step 514. Although steps 512 and 514 are shown as a potential path following step 510 within the flow diagram of FIG. 5, the steps preceding these two steps need not be performed every time the data structure is accessed or network settings/resources are applied to the polling computer. These two steps may be performed completely independent of steps 502-510 as shown in the figure. For example, a data structure 212 already containing network information may be copied onto a computing device being configured to communicate on the network 220. Steps 502-510 may not be needed in this situation because network information is already available in the data structure 212. As another example, the polling computer may have stopped collecting network information from voting computer(s), but the computer may still access the data structure 212 at a later point in time to apply additional settings or resources that were not previously applied.

Figure 6:
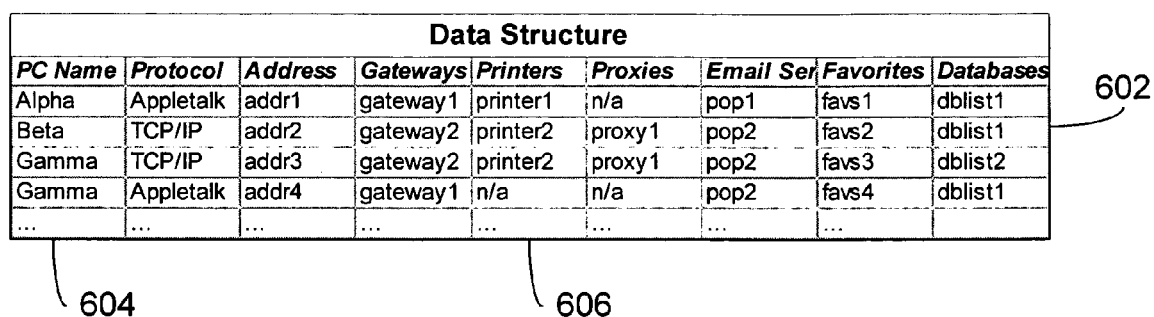
FIG. 6 is a diagram of a data structure in accordance with teachings of the invention.

An example of a data structure 212 is shown in FIG. 6. The data structure 212 may be a list, table, spreadsheet, database, or other suitable data structure that associates a particular voting computer with fields in the data structure representing settings, preferences, and/or resources of the voting computer. The data structure is populated with one entry, such as entry 602, for each voting computer that responds to a request for information. The data structure 212 may comprise a field 604 containing an identifier for the voting computer that has provided the information in each entry. The identifier can be the name of the computer for example. One of ordinary skill in the art would recognize that other suitable identifiers can be used to identify the voting computers. This data structure 212 may have additional fields, such as field 606, representing data associated with protocols, addresses, gateways, printers, proxies, email servers, favorite website lists, databases, etc. The name of the resource or setting, address associated with a resource/setting (such as an internet protocol (IP) address), and/or any other suitable information needed to locate and/or use a given resource/setting may be discovered from a voting computer. The data structure 212 may be sortable within a particular field and a running total of specific entries may be maintained such that the user knows how many times a given value in a field appears in the data structure.

The data structure 212 is populated by the polling computer for a desired amount of time and/or number of entries. In alternate embodiments, the data structure may be continuously populated or may be periodically populated to reflect any changes in voting computer settings/resources. Once the data structure 212 is sufficiently populated, default network settings can be chosen based upon which settings appear most frequently, i.e., the most "popular" settings. The reason why the most popular selections are chosen is because it is likely that the network settings used most frequently are the correct or preferred settings for the computer trying to connect to the network 220. Similarly, the most commonly used resources are likely resources that the user of the polling computer would like to use or know about. These settings may be applied automatically or they may be presented to the user for approval before they are applied.

To maintain the integrity of the data in the data structure, the tribal knowledge module 200 may keep track of computers from which it has already polled and received data. Any duplicate data may be discarded, or the list may be updated to reflect any new settings or resources that may have been adopted by the voting computer. Ultimately, the list is maintained such that there are no duplicate entries from the same computer that would skew the data in the data structure 212.

Instead of making selections solely based upon frequency of occurrence, entries in the data structure may be weighted based on factors such as proximity of the voting computer with respect to the polling computer or based on the similarities between the voting and polling computers. Therefore, proximity and/or similarity may be taken into account when selecting network settings and/or resources. Proximity may be measured, for example, by how quickly the data arrives from the voting computer or hop counts. Similarities, for example, may be determined by similarity between the polling and voting computer's hardware, software, other system defaults or settings, common memberships in workgroups or domains, and/or email server provided organizational structure data, for example. It may be desirable to weight entries because the settings of certain voting computers may be more relevant to the polling computer than other voting computers that are farther away and/or less similar.

By way of example and not limitation, a weight may be given to a particular default printer based upon the number hops a response took from a voting computer to the polling computer. For this example, assume that the data structure 212 contains an entry from a first voting computer using printer 1 that took 10 hops to reach the polling computer, a second entry for a second voting computer using printer 1 that took 20 hops to reach the polling computer, and a third entry for a third voting computer using printer 2 that took 5 hops to reach to the polling computer. Instead of using strict popularity/frequency of use and counting each entry as one vote for a particular printer (which would result in the selection of printer 1 as the default printer on the polling computer), each vote can be weighted by taking the inverse of the number of hops. This results in the first voting computer have a vote of 0.1 (1/10) for printer 1, the second computer having a vote of 0.05 (1/20) for printer 1, and the third voting computer having a vote of 0.2 (1/5) for printer 2. Adding up the votes for each printer using the weighted votes, printer 1 has 0.15 votes (i.e., 0.1 from the first voting computer plus 0.05 from the second voting computer) and printer 2 has 0.2 votes. Therefore, the default selection for the polling computer would be printer 2 because it has a higher weighted vote total than printer 1, even though more computers use printer 2. This is just one simple example of the many ways that a weighting calculation can take place. One of ordinary skill in the art would appreciate that any suitable method of weighting data in the data structure 212 and selecting network information from the data structure 212 may be used.

Once information from voting computers on the network has been gathered and stored in a data structure 212, the most frequently occurring resources may be automatically loaded, selected, saved as preferences, or set as defaults on the polling computer. For example, popular websites may be automatically saved in a folder within the polling computer's internet browser. Alternatively, the data structure 212 may be presented on a graphical user interface (GUI) to a user. The user may then review not only the most popular resources, but also view other resources being used by other computers on the network. This allows the user to select resources other than the most popular, if desired. For example, in certain situations, a user may not want the most popular resource, such as for a printer, because the user will have to compete with a larger number of users in the printer queue. Thus, the user may decide to select another printer from the data structure 212 that is not the most popular. Presenting the data structure 212 to a user also allows a user to decline to apply certain resources that the user is not interested in using.

The information in the database may be presented to the user via a variety of user interfaces. For example, shown in FIG. 13, the user interface may be a dialog box 1300 presenting a recommended setting to a user. Alternatively, the information may be presented as a list, which may be sortable based on a particular field in the list, or the information may be presented as a two dimensional or three dimensional graph. Other ways of displaying the database in a graphical user interface include showing certain results as objects on the display. The objects on the display may, for example, have varying sizes, apparent distance, color, luminosity, transparency, velocity, varying animations. By way of example and not limitation, if a user is deciding which printer to use, the user may be presented with a display having icons representing different printers, the icons being different sizes on the display to show the relative popularity of each printer. The relative size of the printers indicates to a user which printers are more commonly used than others on the network. More frequently used printers are represented by larger printer icons and less frequently used printers are represented by smaller printer icons. In this way, the user is able to easily determine which printer is best for the user's needs.

Figure 7:
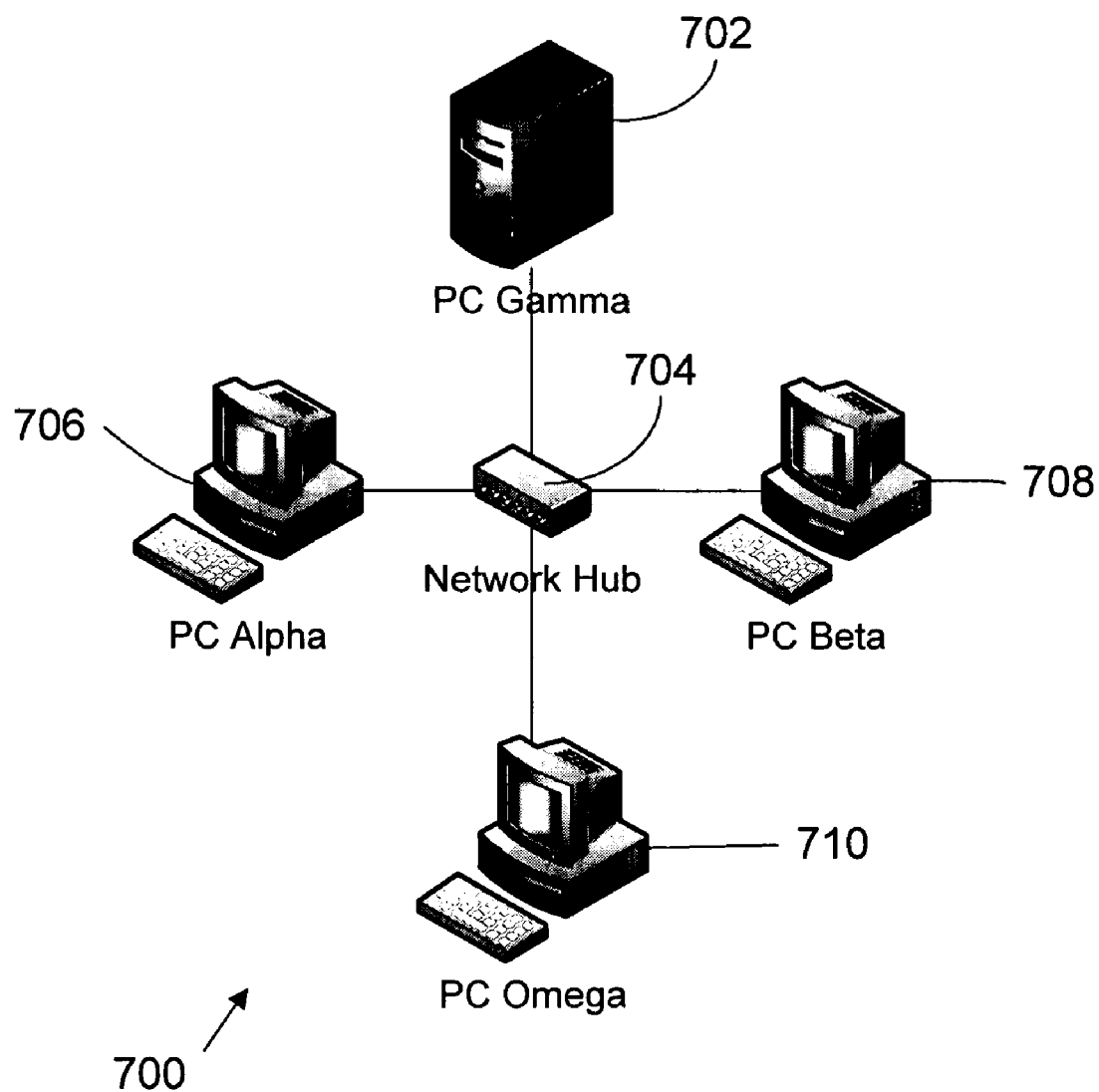
FIG. 7 is a diagram of a simple network.
Figure 8:
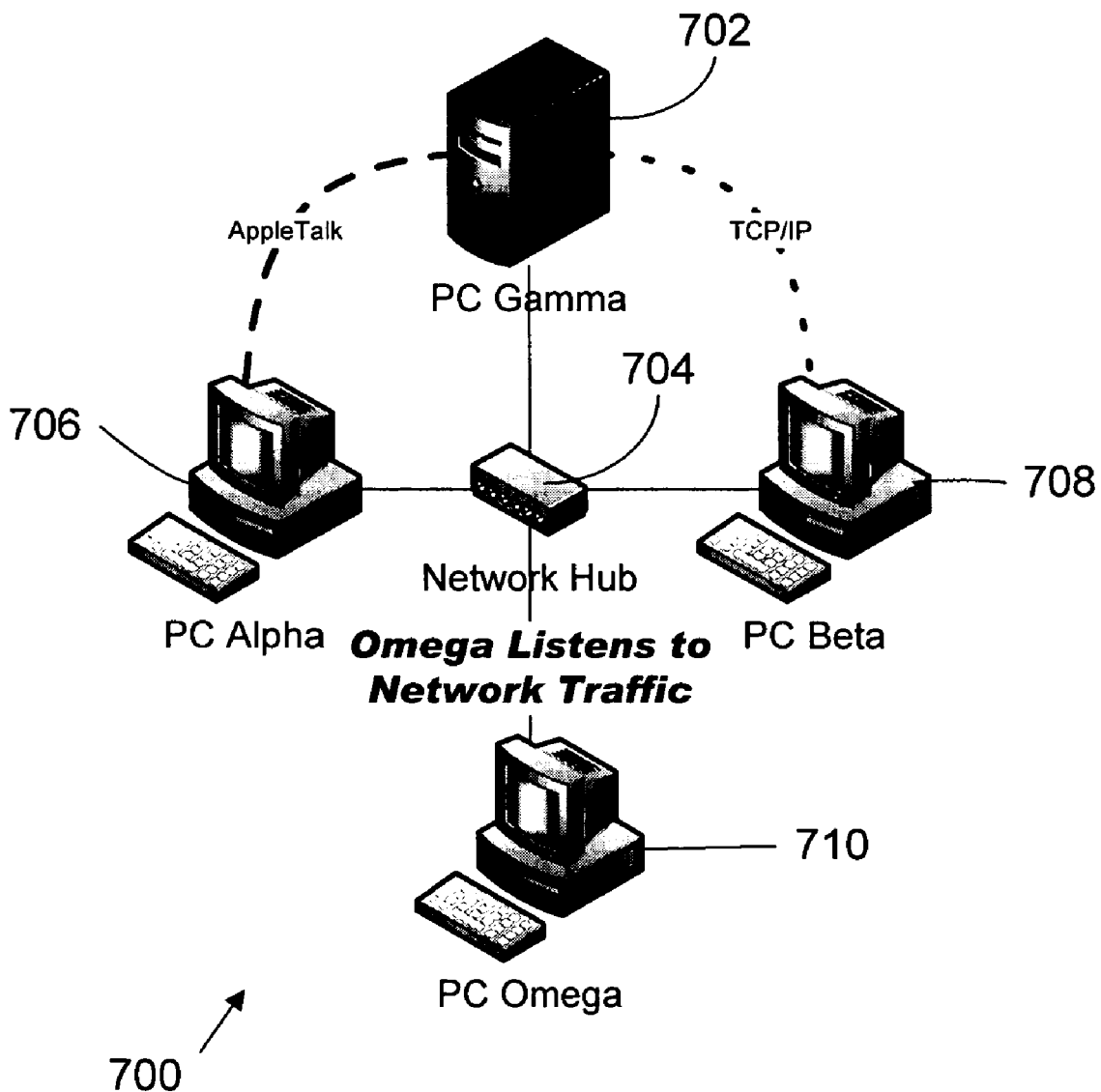
FIG. 8 is diagram showing a computer listening to network traffic.
Figure 9:
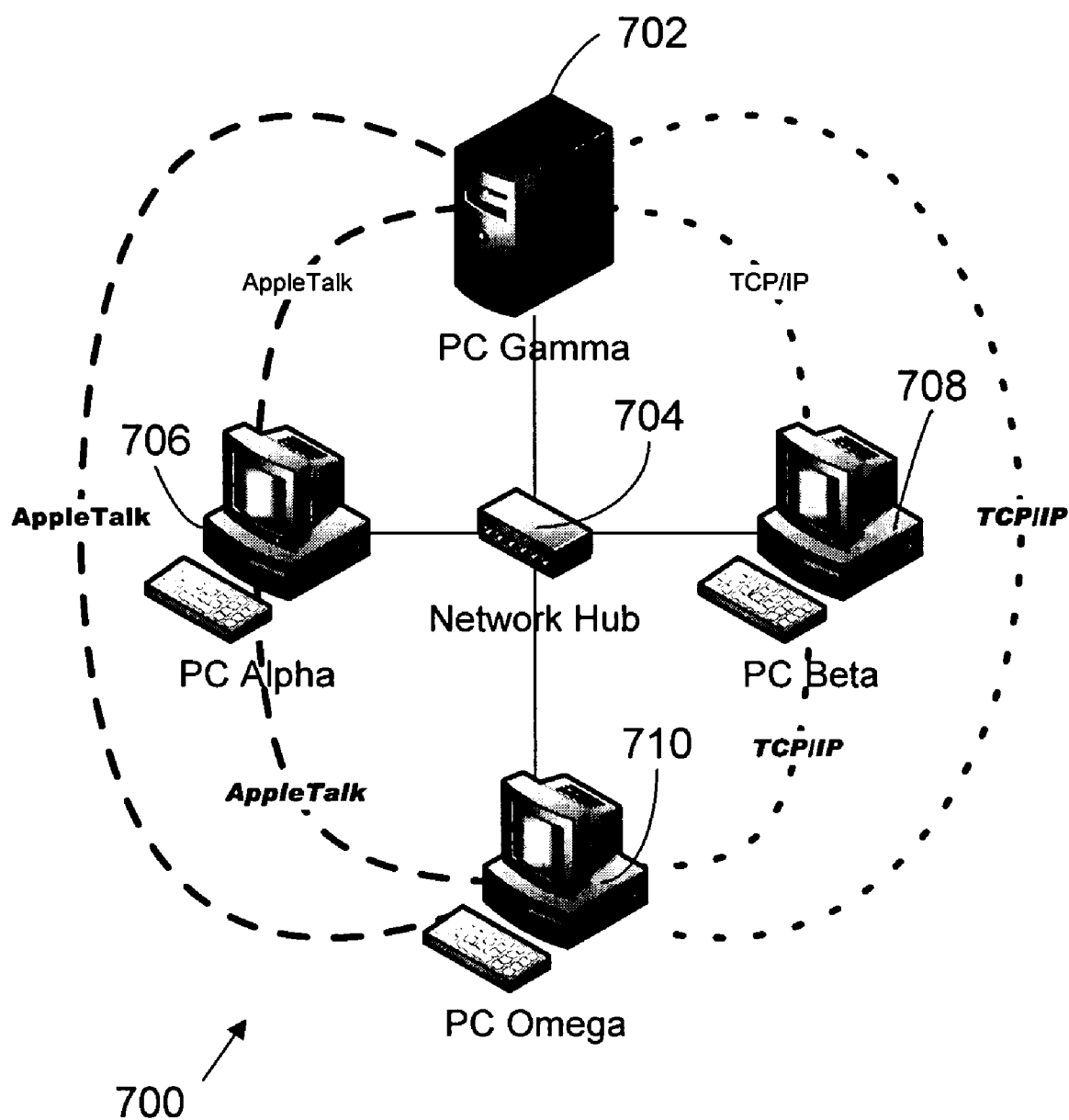
FIG. 9 is a diagram showing a computer communicating over a network.

The following example further illustrates the invention but, of course, should not be construed as in any way limiting its scope. FIG. 7 shows an example of a network 700 comprising a server 702, a hub 704, and personal computers (PC's) Alpha 706, Beta 708, and Omega 710. It will be seen in FIG. 8 that PC Alpha 706 and PC Beta 708 are already communicating over the network using the AppleTalk and TCP/IP protocols, respectively. PC Omega 710 has recently been connected to the network 700 and the tribal knowledge module 200 has been initiated. The protocol discovery component 202 is being used to listen to network traffic and determine which protocols are being used on the network 700. As protocols are discovered, the protocol discovery component 202 installs and loads the necessary drivers to enable PC Omega 710 to communicate using these protocols. As shown in FIG. 9, PC Omega 710 now has the necessary drivers installed to communicate using both AppleTalk and TCP/IP.

Figure 10:
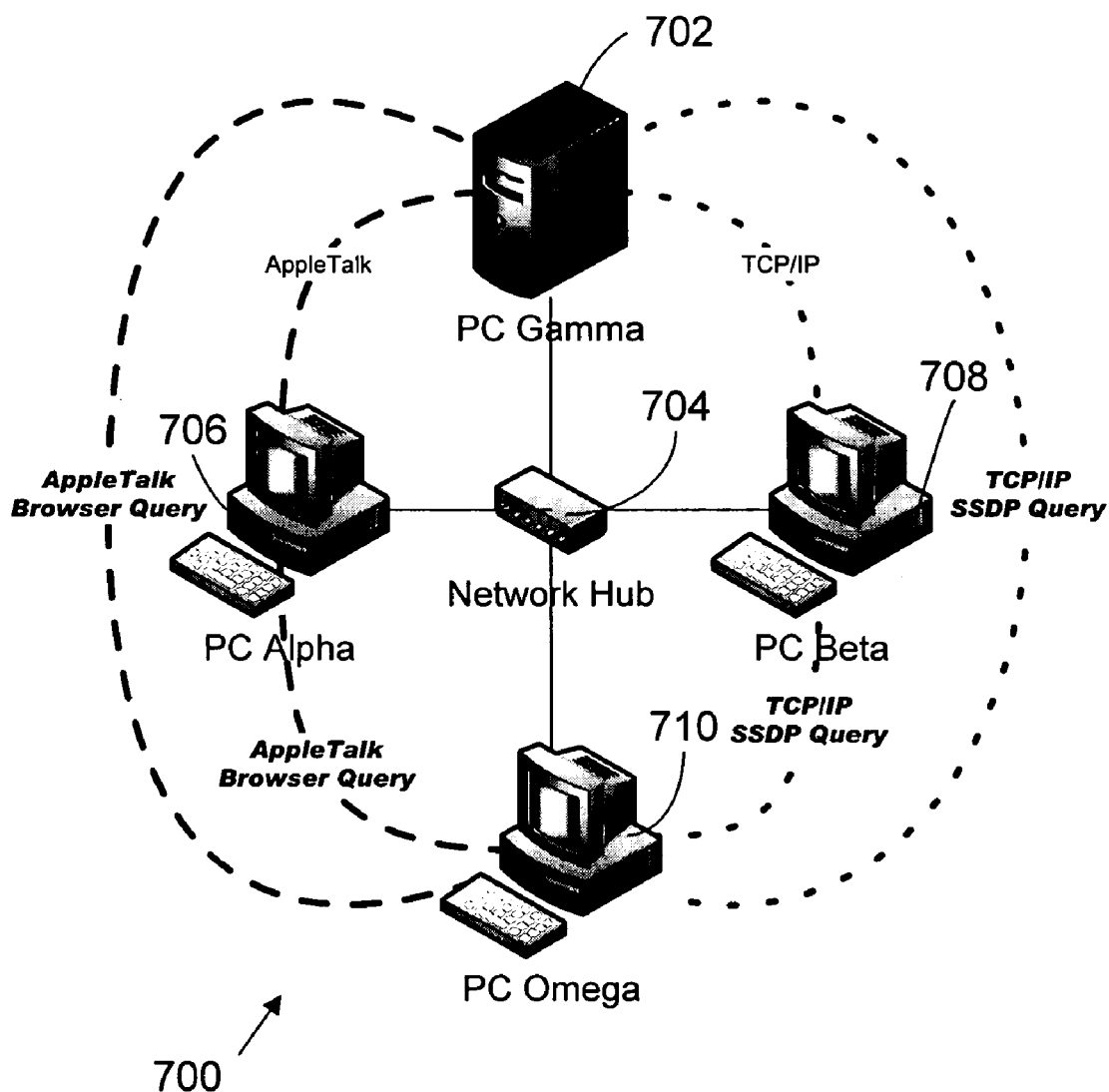
FIG. 10 is a diagram showing a computer sending queries to discover other computers on a network.
Figure 11:
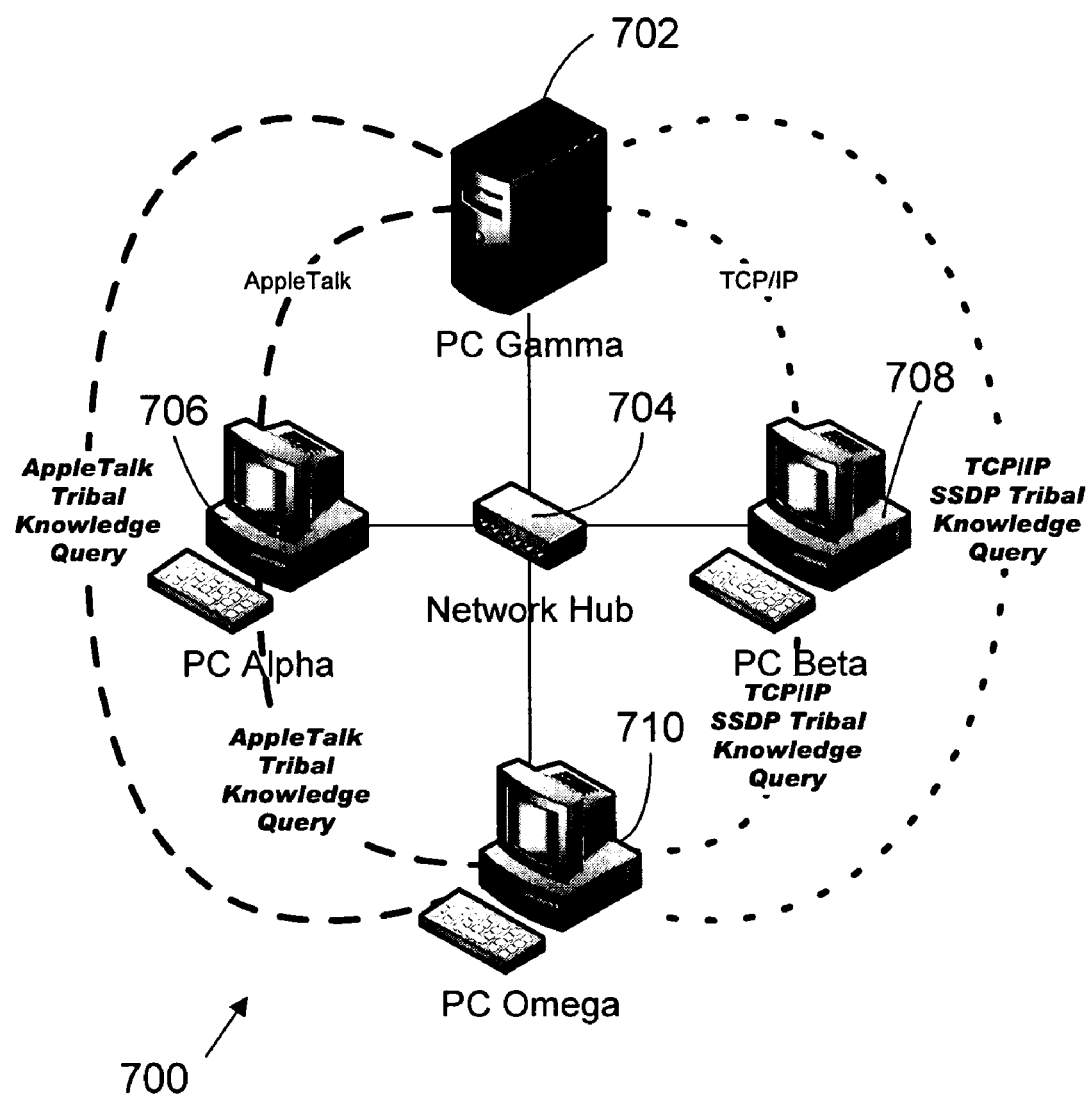
FIG. 11 is a diagram showing a computer sending queries for tribal knowledge to other computers on a network.
Figure 12:
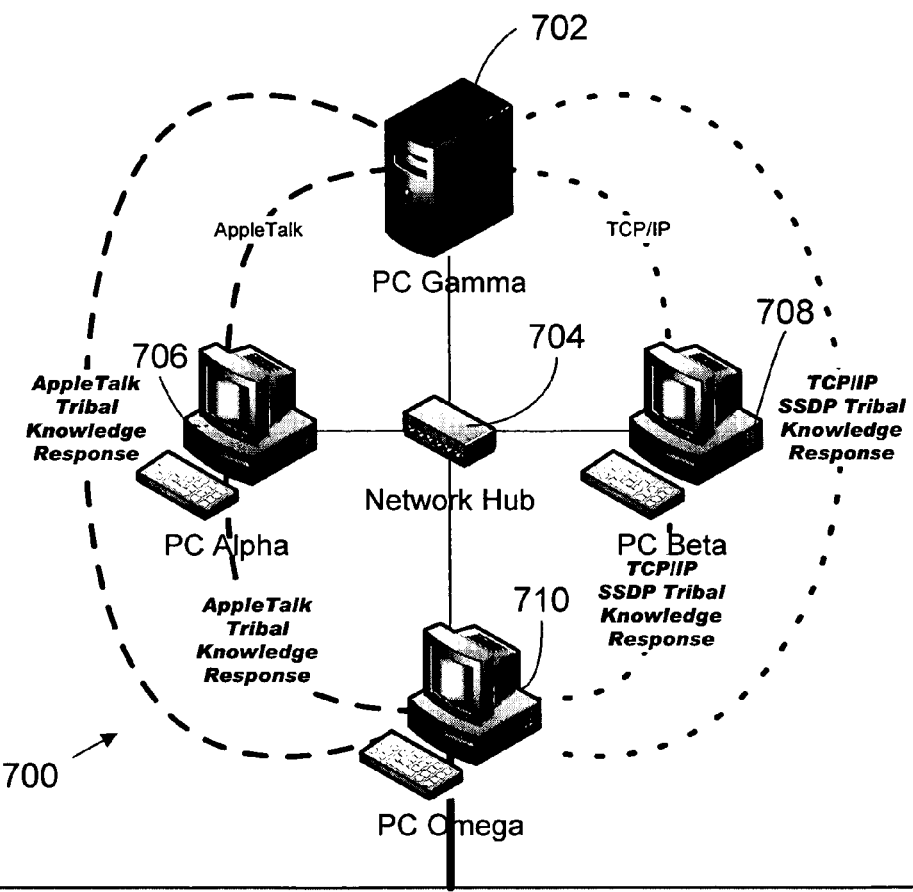
FIG. 12 is a diagram showing a computer receiving responses to the tribal knowledge query of FIG. 1.

Once the protocols have been installed on PC Omega 710, this PC queries into the network 700 to attempt to find other PC's connected to the network 700 as shown in FIG. 10. Once PC's such as PC Alpha 706 and Beta 708 have been discovered, PC Omega 710 sends queries to the discovered PC's (voting PC's) for information such as network settings and network resources as shown in FIG. 11. The voting PC's 706, 708 respond in FIG. 12 with the requested information, which is sent to PC Omega 710. As this information is received at PC Omega 710, the tribal knowledge module 200 stores the information in a data structure 212, such as a database table. Finally, as shown in FIG. 13, the tribal knowledge module 200 automatically selects default settings for the user and/or prompts a user to select settings using a user interface element 1300, such as a dialog box. These settings may be selected or recommended by the tribal knowledge module 200 based upon which setting is most "popular." Popularity, as described above, may be determined by the number of instances that a particular setting appears in the database 212. Alternately or in addition, settings and recommendations may be based on a weighting system that takes into account similarity of PC's and/or proximity of the PC's to one another. As shown in FIG. 13, printer 2 appears most frequently in the data structure 212, so the user is prompted by a user interface 1300 to make this printer the default printer for PC Omega 710.

In certain alternate embodiments, a network setting or network resource may be immediately applied to a polling computer or may be presented in a user interface upon receipt of this information from the voting computer. For example, following step 508 of FIG. 5, the requested network information may be immediately applied or presented to the user. If the information is presented to the user, then the user may be prompted to make a decision on whether to apply this setting or resource to the polling computer. This can be useful, for example, when a user is setting up a computer to communicate over a network and the user is already aware of another computer that is communicating over the network.

By way of example and not limitation, the user can have the information query component 208 send a request for information to the other computer that is already configured to communicate on the network. Once this information is received, the network settings and/or resources may be automatically applied to the polling computer, essentially mirroring the settings and/or resources from the voting computer. This can be useful for a person that is attempting to set up multiple new computers at the same time. The user may perform steps 502-514 on one of the new computers, and the user can have the other computers poll this computer to retrieve the identical setting/resource information. Similarly, a user may be configuring a new computer in his/her home and would like to replicate the setting and/or resources from one of his/her other computers on his/her home network. The user can have the new computer poll and automatically apply the settings/resources of another computer in his/her home network. When a user would like to see a particular setting or resource before it is applied on his/her computer, the setting/resource may be presented in a user interface, such as user interface 1300, on the polling computer.

The invention is capable of taking into account the fact that privacy concerns may exist when information about one computer is sent to another. Thus, access to certain settings and resources may be restricted by a user of a voting computer. For example, a user of a voting computer may not want to share all of the websites that they visit. Instead, the user may want to only share those websites in the user's favorite websites folder, or the user may establish a shared website folder where the user may place links to only those websites that the user wants to share. Thus, when a request for information is sent from a polling computer to a voting computer, only those resources and settings that the user of the voting computer wants to share will be sent in the response. Furthermore, a voting computer may be configured to not respond to any requests for information should the user of the voting computer so choose.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computing device, comprising:
 a memory, a processing unit, and computer-executable instructions stored on the memory, the computer-executable instructions being executable by the processing unit to:
 connect the computing device to a network configured for communication between multiple voting computing devices;
 responsive to connecting the computing device to the network, automatically initiate:
 monitoring of transmissions on the network between the multiple voting computing devices;

determining of communication protocols used in the transmissions between the multiple voting computing devices;

automatic enabling of the computing device to communicate using one or more of the communication protocols once the communication protocols have been determined;

obtain, using the one or more communication protocols, information from the multiple voting computing devices for network settings and network resources used by the multiple voting computing devices;

store the obtained information as entries in a data structure;

weight the entries in the data structure to determine popularities of the entries, wherein an entry is weighted based on a measure of similarity indicative of device configuration similarities between the computing device and a respective voting computing device of the multiple voting computing devices that corresponds to the entry and a measure of proximity within the network between the computing device and the respective voting computing device of the multiple voting computing devices; and automatically configure the computing device to use particular network settings or particular network resources based on the popularities of the entries.

2. The computing device of claim 1 wherein the automatic enabling of the computing device comprises installing respective drivers for the one or more communication protocols.

3. The computing device of claim 1 wherein the automatic enabling of the computing device comprises loading respective drivers for the one or more communication protocols.

4. The computing device of claim 1, wherein to obtain the information from the multiple voting computing devices for the network settings and the network resources used by the multiple voting computing devices comprises:

querying a first of the multiple voting computing devices to discover at least one of network settings used by the first of the multiple voting computing devices or network resources used by the first of the multiple voting computing devices; and querying a second of the multiple voting computing devices to discover at least one of network settings used by the second of the multiple voting computing devices or network resources used by the second of the multiple voting computing devices.

5. The computing device of claim 1, wherein the computer-executable instructions are further executable by the processing unit to present a user interface to a user, wherein the user interface comprises an interface for the one or more communication protocols.

6. A polling computing device, comprising:

a memory, a processing unit, and computer-executable instructions stored on the memory, the computer-executable instructions being executable to:

connect the polling computing device to a network;

query a first voting computing device for network settings used by the first voting computing device to communicate across the network or a network resource used by the first voting computing device;

query a second voting computing device for network settings used by the second voting computing device to communicate across the network or a network resource used by the second voting computing device;

receive responses to the queries;

store information contained in the responses as network setting or network resource entries in a data structure;

weight the entries in the data structure to determine popularities of the entries using a measure of similarity between a hardware configuration of the polling computing device and hardware configurations of the respective voting computing devices corresponding to the entries and a measure of proximity within the network between the polling computing device and the respective voting computing devices corresponding to the entries; and automatically configure the polling computing device to use particular network settings or particular network resources based on the responses to the queries and the popularities of the entries.

7. The polling computing device of claim 6, wherein the polling computing device is automatically configured to use the particular network settings or the particular network resources by selecting the entries in the data structure that appear most frequently.

8. The polling computing device of claim 6, wherein the computer executable instructions are further executable to weight the entries in the data structure based on an additional measure of similarity between the polling computing device and the respective voting computing devices corresponding to the entries, the additional measure of similarity corresponding to at least one of: a software configuration, a system default, a system setting, a common membership in a workgroup, or a common membership in a domain.

9. The polling computing device of claim 6, wherein the computer executable instructions are further executable to present a user interface that displays the information contained in the responses.

10. The polling computing device of claim 6, wherein the automatic configuration of the polling computing device to use the particular network settings or the particular network resources comprises applying the particular network settings on the polling computing device.

11. The polling computing device of claim 6, wherein the automatic configuration of the polling computing device to use the particular network settings or the particular network resources comprises selecting default network resources as the particular network resources.

12. In a computer system configured to display a graphical user interface and having a user interface selection device, a method for discovering at least one of a network setting used by a first voting computing device on a network to communicate with a second voting computing device via the network, or a network resource used by the first voting computing device on the network, the method comprising:

connecting a polling computing device to the network, and based on the connecting of the polling computing device, automatically querying the first voting computing device for network settings used by the first voting computing device on the network to communicate with the second voting computing device via the network, and network resources used by the first voting computing device;

receiving a response to the query from the first and second voting computing devices indicating at least one of the network setting used by the first and second voting computing devices or the network resource used by the first and second voting computing devices;

weighting one or more of the at least one network setting or the network resource as indicated in the response based upon one or more of the similarities between a hardware configuration of the polling computing device and a hardware configuration of the first and second voting computing devices, a measure of proximity within the network between the polling computing device and the first and second voting computing devices, or a popularity of the at least one network setting or the network resource as indicated in responses by other voting computing devices on the network; and presenting, based on the weighting, the at least one network setting or the network resource for display on a user interface element of the graphical user interface; and receiving a selection of the at least one network setting or the network resource via the user interface selection device to automatically configure the at least one network setting or the network resource on the polling computing device.

13. The method of claim 12, wherein the at least one network setting or the network resource that is displayed on the graphical user interface is retrieved from the data structure.

14. The method of claim 12 further comprising:
monitoring transmissions on a network;
determining a protocol used in the transmissions; and
automatically enabling the polling computing device to communicate using the protocol once the protocol has been determined.

15. The computing device of claim 1, wherein the measure of proximity is based on a speed of arrival of the obtained information.

16. The computing device of claim 1, wherein the measure of proximity is based on a hop count.

17. The polling computing device of claim 6, wherein the measure of proximity is based on a respective speed of arrival of each of the received responses.

18. The polling computing device of claim 6, wherein the measure of proximity is based on a hop count.

19. The computer system of claim 12, wherein the measure of proximity is based on a speed of arrival of the received response.

20. The computer system of claim 12, wherein the measure of proximity is based on a hop count.

* * * * *